US011794262B2

(12) United States Patent
Kalomeris et al.

(10) Patent No.: US 11,794,262 B2

(45) Date of Patent: *Oct. 24, 2023

(54) RECIPROCATING SAW BLADE

(71) Applicant: BLACK & DECKER INC., New Britain, CT (US)

(72) Inventors: Charles Kalomeris, East Longmeadow, MA (US); Matthew Savarino, Manchester, CT (US)

(73) Assignee: BLACK & DECKER INC., New Britain, CT (US)

(*) Notice: Subject to any disclaimer, the term of this patent is extended or adjusted under 35 U.S.C. 154(b) by 640 days.

This patent is subject to a terminal disclaimer.

(21) Appl. No.: 16/809,754

(22) Filed: Mar. 5, 2020

(65) Prior Publication Data

US 2020/0198034 A1 Jun. 25, 2020

Related U.S. Application Data

(60) Continuation of application No. 15/648,699, filed on Jul. 13, 2017, now Pat. No. 10,618,124, which is a (Continued)

(51) Int. Cl.

*B23D 61/12* (2006.01)

*B28D 1/12* (2006.01)

(52) U.S. Cl.

CPC ......... *B23D 61/123* (2013.01); *B23D 61/128* (2013.01); *B28D 1/127* (2013.01); *Y10T 83/935* (2015.04)

(58) Field of Classification Search

CPC .... B23D 61/123; B23D 61/128; B28D 1/127; Y10T 83/935

(Continued)

(56) References Cited

U.S. PATENT DOCUMENTS 1,181,529 A 5/1916 Hutton 1,734,554 A 11/1929 Behrman (Continued)

FOREIGN PATENT DOCUMENTS

DE 8603266 U1 7/1987

DE 29607673 U1 8/1997

(Continued)

OTHER PUBLICATIONS

International Search Report and Written Opinion, PCT Application No. PCT/US2010/025951, dated Apr. 29, 2010, 8 pages, USPTO.

(Continued)

*Primary Examiner* — Hadi Shakeri

(74) *Attorney, Agent, or Firm* — Scott B. Markow

(57) ABSTRACT

A reciprocating saw blade includes an axially elongated blade body having a first end portion, a second end portion, a cutting edge extending from the first end portion to the second end portion, and an opposite back edge extending from the first end portion to the second end portion. An exposed first tang is coupled to the first end portion and is configured to removably mount the blade body in a blade holder of a powered reciprocating saw. An unexposed second tang is defined by a first score in the blade body between the first end portion and the second end portion. The first score is configured so that the second tang can be exposed by breaking off a first removable portion of the blade body at the first score. The second tang is configured to removably mount the blade body in a blade holder of a powered reciprocating saw when the second tang is exposed.

20 Claims, 10 Drawing Sheets

Related U.S. Application Data continuation of application No. 14/590,671, filed on Jan. 6, 2015, now Pat. No. 9,737,943, which is a division of application No. 12/396,318, filed on Mar. 2, 2009, now Pat. No. 8,926,410.

(58) Field of Classification Search
USPC .............................................................. 83/13
See application file for complete search history.

(56) References Cited

U.S. PATENT DOCUMENTS

| | | | |
|---|---|---|---|
| 2,335,141 A | 11/1943 | Blum | |
| 2,946,778 A | 7/1960 | Knuth | |
| D204,877 S * | 5/1966 | West | D8/20 |
| 3,448,518 A | 6/1969 | Sklar | |
| 3,630,699 A | 12/1971 | Catlin | |
| 3,929,050 A | 12/1975 | Salzwedel | |
| 4,233,734 A | 11/1980 | Bies | |
| 4,322,885 A | 4/1982 | Osada | |
| 4,499,936 A | 2/1985 | Nilsson | |
| 4,794,692 A | 1/1989 | Wang | |
| 4,835,869 A | 6/1989 | Waldherr | |
| 5,062,338 A | 11/1991 | Baker | |
| 5,103,564 A * | 4/1992 | MacDonald | B26B 9/00 76/104.1 |
| 5,103,565 A | 4/1992 | Holzer, Jr. | |
| 5,125,927 A * | 6/1992 | Belanger | A61B 18/14 606/49 |
| 5,509,339 A * | 4/1996 | Grant | B23D 65/00 83/862 |
| 5,573,255 A | 11/1996 | Salpaka | |
| 5,706,583 A * | 1/1998 | Gengenbach | B23D 61/123 83/835 |
| 5,706,585 A | 1/1998 | Wang | |
| 5,711,287 A | 1/1998 | Speer | |
| 5,896,799 A | 4/1999 | Chen | |
| 6,105,482 A | 8/2000 | Garcia et al. | |
| 6,129,617 A | 10/2000 | Adams | |
| 6,401,585 B1 | 6/2002 | Morgan | |
| 6,457,468 B1 | 10/2002 | Goldberg | |
| 6,718,640 B1 | 4/2004 | John | |
| D506,113 S | 6/2005 | Snape et al. | |
| 7,174,644 B2 | 2/2007 | Critelli et al. | |
| D608,168 S | 1/2010 | Green | |
| D628,453 S | 12/2010 | Green | |
| 7,921,568 B2 | 4/2011 | Green | |
| D644,896 S | 9/2011 | Green | |
| 8,161,654 B2 * | 4/2012 | Green | B26B 9/00 30/346.55 |
| D660,107 S | 5/2012 | Green | |
| 8,413,339 B2 | 4/2013 | Ranieri et al. | |
| 8,926,410 B2 | 1/2015 | Kalomeris et al. | |
| 9,132,492 B2 | 9/2015 | Butzen | |
| 2004/0139617 A1 | 7/2004 | Neshat et al. | |
| 2005/0235799 A1 | 10/2005 | Hampton et al. | |
| 2006/0086218 A1 | 4/2006 | Quinn | |
| 2007/0056427 A1 | 3/2007 | Males | |
| 2008/0307936 A1 | 12/2008 | Elliston et al. | |
| 2010/0218389 A1 | 9/2010 | Kalomeris et al. | |
| 2013/0239415 A1 | 9/2013 | Wagner | |

FOREIGN PATENT DOCUMENTS

| | | |
|---|---|---|
| DE | 20220102 U1 | 3/2003 |
| DE | 202004016449 U1 | 1/2005 |
| DE | 102008001399 A1 | 10/2009 |
| EP | 1970149 A1 | 9/2008 |
| EP | 2087960 A1 | 8/2009 |
| EP | 2508287 A1 | 10/2012 |
| EP | 2957371 A1 | 12/2015 |
| GB | 2443252 A | 4/2008 |
| JP | S61-111807 A | 5/1986 |
| JP | 2002-018639 A | 1/2002 |
| WO | 2010035297 A1 | 4/2010 |
| WO | 2010101942 A1 | 9/2010 |

OTHER PUBLICATIONS

Extended European Search Report, EP Application No. 15172989.4, dated Oct. 16, 2015, 6 pages, EPO.

* cited by examiner

RECIPROCATING SAW BLADE

CROSS REFERENCE TO RELATED APPLICATIONS

This application is a continuation of U.S. patent application Ser. No. 15/648,699, filed Jul. 13, 2017, now U.S. Pat. No. 10,618,124, which is a continuation of U.S. patent application Ser. No. 14/590,671, filed Oct. 22, 2015, now U.S. Pat. No. 9,737,943, which is a divisional of U.S. patent application Ser. No. 12/396,318, filed Mar. 2, 2009, now U.S. Pat. No. 8,926,410, each of which is hereby incorporated by reference in their entirety.

TECHNICAL FIELD

The present invention relates to saw blades, and more particularly, to reciprocating saw blades having tangs on each end and to related methods of use.

BACKGROUND

Typical prior art reciprocating saw blades include a blade portion having a cutting edge defined by a plurality of teeth axially spaced relative to each other along one side of the blade, and a non-working edge formed on an opposite side of the blade relative to the cutting edge. The inner ends of such reciprocating saw blades define tangs for releasably connecting the blades to chucks of reciprocating saws. The outer ends of reciprocating saw blades do not define tangs and are not connectable to chucks of reciprocating saws. Rather, the outer ends of reciprocating saw blades are free ends and the cutting edges of such saw blades extend to the distal tips of the free ends.

A reciprocating saw machine is a hand-held power saw including a chuck that releasably engages only one end of the reciprocating saw blade (i.e., the tang on the inner end of the saw blade) and drives the inner end and thus the saw blade in a reciprocating motion through a work piece. Reciprocating saw machines are typically driven by electric motors (e.g., cord or cordless saws), or are pneumatically driven. The reciprocating motion can be an orbital cutting action, a straight or linear cutting action, or an angled cutting action. Reciprocating saws are sometimes referred to as recip saws, or jig saws, and reciprocating saw blades are sometimes referred to as recip blades or jig saw blades. A jig saw includes a handle and a relatively small, thin blade oriented to be used comfortably on horizontal surfaces. A recip saw usually has a larger blade and blade-mounting assembly resembling that of a jig saw, but includes a handle oriented to allow the saw to be used comfortably on vertical surfaces. Well known reciprocating saws are sold under the brand names "Sawzall™" by Milwaukee Electric Tool Corporation and "Tiger Saw™" by Porter-Cable Corporation. A reciprocating saw blade is a saw blade adapted for use in a reciprocating saw, such as a recip saw or a jig saw, where the inner end of the blade engages the chuck of a reciprocating saw, and the outer end is a free end of the blade that does not engage the chuck during use.

Standardized or universal chucks and corresponding tangs allow reciprocating saw users to easily change reciprocating saw blades due to blade wear or to customize the saw blade to suit a particular application. For instance, blades with finer teeth may be used for cutting through metal, while abrasive blades may be used for cutting through tile. Similarly, long, general-purpose blades may be used for cutting through a variety of materials, from drywall to tree-limbs, lumber or even nails.

The most common and safe way to use a reciprocating saw, such as a jig saw or recip saw, is to place the foot or shoe of the saw against the workpiece to help keep the saw steady and reduce vibration, i.e., to ensure the push and pull forces move the blade through the workpiece as opposed to moving the body of the saw or the workpiece itself. Because most workpieces are relatively small as compared to typical reciprocating saw blades, and because the length of each saw blade stroke is relatively short (typically about ¾ inch to about 1¼ inches), reciprocating saw blades typically incur most wear and/or wear out along a primary cutting surface defined by the inner end of the cutting edge adjacent to the foot or shoe. As a result, it is frequently necessary to discard a reciprocating saw blade that is worn out only along the inner portion of the blade, whereas the outer portion of the blade may not be worn out at all and/or may have significant wear life remaining. This problem can be particularly acute in connection with relatively expensive blades, and/or blades made with relatively expensive cutting edge materials, such as reciprocating saw blades with carbide and/or diamond grit cutting edges.

In previous attempts to solve this problem, blade manufacturers have made shorter reciprocating saw blades so that users consume the entire cutting edge and reduce waste and cost. However, short blades have limited capabilities as they are not well suited to handle large workpieces. As a result, reciprocating saw users may be required to obtain multiple blades of differing lengths to suit particular workpiece restraints, thereby increasing costs and requiring more frequent blade changes.

It is an object of the present invention to overcome one or more of the above-described drawbacks and/or disadvantages of the prior art.

SUMMARY

In accordance with a first aspect, the present invention is directed to a reciprocating saw blade for use in a reciprocating saw having only one chuck that releasably engages one end of the reciprocating saw blade and thereby defines a free end at the other end of the saw blade that is driven by the reciprocating saw in a reciprocating motion. The reciprocating saw blade comprises a blade body defining a first end and a second end. A first tang is located at the first end of the blade body and is engageable with the chuck of the reciprocating saw. A second tang is located at the second end of the blade body and is alternatively engageable with the chuck of the reciprocating saw. A substantially uniform cutting edge extends from approximately the first end to approximately the second end of the blade body. The first tang is engageable with the chuck of the reciprocating saw for fixedly securing the first end of the blade body to the reciprocating saw with the second tang located at a free end of the saw blade and drivable in a reciprocating motion by the reciprocating saw. Alternatively, the second tang is engageable with the chuck of the reciprocating saw for fixedly securing the second end of the blade body to the reciprocating saw with the first tang located at a free end of the saw blade and drivable in a reciprocating motion by the reciprocating saw.

In some embodiments of the present invention, the substantially uniform cutting edge of the saw blade is defined by a grit. In some such embodiments, the grit includes carbide and/or diamond. In some embodiments of the present invention, each tang extends outwardly in an elongated direction of the blade on the respective end of the blade. Each tang includes a tang body and a tang stem defining a reduced-width portion of the tang that extends outwardly of the tang body in the elongated direction of the blade.

In accordance with another aspect of the present invention, the reciprocating saw blade defines scores for facilitating removal of at least a portion of the first or second tangs. Removal of at least a portion of the first or second tangs forms a free end of the blade body that defines a tip. The score extends substantially between the back edge and the cutting edge for facilitating removal of the first and second tangs and forming a tip. In some embodiments of the present invention, the first and/or second tang is defined by a score and a tip region extending outwardly from the score. The tip region is manually engageable to break away the tip region at the score and expose the respective tang for use. In some embodiments, the first tang is defined by a first score, and the second end of the blade defines a second score spaced inwardly relative to the second tang. The second tang is manually engageable to break away the second tang at the second score to form a tip at the second score.

In accordance with another aspect, the present invention is directed to a reciprocating saw blade for use in reciprocating saw having only one chuck that releasably engages one end of the reciprocating saw blade and thereby defines a free end at the other end of the saw blade that is driven by the reciprocating saw in a reciprocating motion. The reciprocating saw blade comprises a blade body defining a first end and a second end. First means are located at the first end of the blade body for engaging the chuck of the reciprocating saw, drivingly mounting the first end of the blade to the reciprocating saw, and forming a free end of the blade with the second end of the blade body. Second means are located at the second end of the blade body for alternatively engaging the chuck of the reciprocating saw, drivingly mounting the second end of the blade to the reciprocating saw, and forming a free end of the blade with the first end of the blade body. The reciprocating saw blade further includes third means forming a substantially uniform cutting surface extending between the first means and the second means. The first means is engageable with the chuck of the reciprocating saw for fixedly securing the first end of the blade body to the reciprocating saw and forming with the second means the free end of the saw blade drivable in a reciprocating motion by the reciprocating saw. The second means is alternatively engageable with the chuck of the reciprocating saw for fixedly securing the second end of the blade body to the reciprocating saw and forming with the first means the free end of the saw blade drivable in a reciprocating motion by the reciprocating saw.

In some embodiments, the reciprocating saw blade includes a means for forming a line of breakage spaced inwardly relative to at least one of the first and second means for manually engaging and breaking away from the blade at the line of breakage at the first and/or second means and, in turn, forming a tip defined by the line of breakage. In some embodiments, the reciprocating saw blade further comprises means for forming the first and/or second means at a line of breakage formed within a respective tip region of the blade for breaking away the respective tip region at the line of breakage and, in turn, exposing the respective first and/or second means for engaging the chuck of the reciprocating saw.

In the currently preferred embodiments of the present invention, the first means is a first tang; the second means is a second tang; and the third means is a grit cutting edge or a toothed cutting edge. In some such embodiments, the second tang is substantially the same as the first tang.

In accordance with another aspect, the present invention is directed to a method comprising the following steps:

(i) providing a reciprocating saw blade defining a blade body, a first end and a second end, a first tang located at the first end of the blade body, a second tang located at the second end of the blade body, and a substantially uniform cutting edge extending from approximately the first end to approximately the second end of the blade body;

(ii) mounting the first tang of the reciprocating saw blade in the chuck of a reciprocating saw and forming with the second tang a first free end of the reciprocating saw blade;

(iii) driving the first free end of the reciprocating saw blade in a reciprocating motion with the reciprocating saw;

(iv) removing the first tang of the reciprocating saw blade from the chuck of the reciprocating saw and mounting the second tang of the reciprocating saw blade in the chuck of the reciprocating saw and forming with the first tang a second free end of the reciprocating saw blade; and (v) driving the second free end of the reciprocating saw blade in a reciprocating motion with the reciprocating saw.

In some embodiments of the present invention, the method further comprises the following steps:

during step (iii), engaging a first region of the cutting edge located proximate to the first tang with a workpiece and wearing the first region of the cutting edge at a faster rate than a second region of the cutting edge located proximate to the second tang; and during step (v), engaging the second region of the cutting edge with a workpiece and wearing the second region of the cutting edge.

One advantage of the present invention is when the primary cutting portion of the reciprocating saw blade (i.e., the inner portion of the reciprocating saw blade adjacent to the chuck or shoe of the reciprocating saw) wears faster than the outer or free end of the reciprocating saw blade, the reciprocating saw blade may be removed from the chuck, flipped or rotated 180°, and the other tang inserted into the chuck to present a relatively fresh primary cutting portion of the same blade. As a result, the blades of the present invention can achieve significantly improved wear life in comparison to prior art reciprocating saw blades. This is particularly advantageous for reciprocating saw blades with relatively expensive elongated cutting edges, such as reciprocating saw blades with carbide and/or diamond grit cutting edges.

Other objects and advantages of the present invention, and/or of the currently preferred embodiments thereof, will become more readily apparent in view of the following detailed description of currently preferred embodiments and accompanying drawings.

DETAILED DESCRIPTION

Figure 1A:
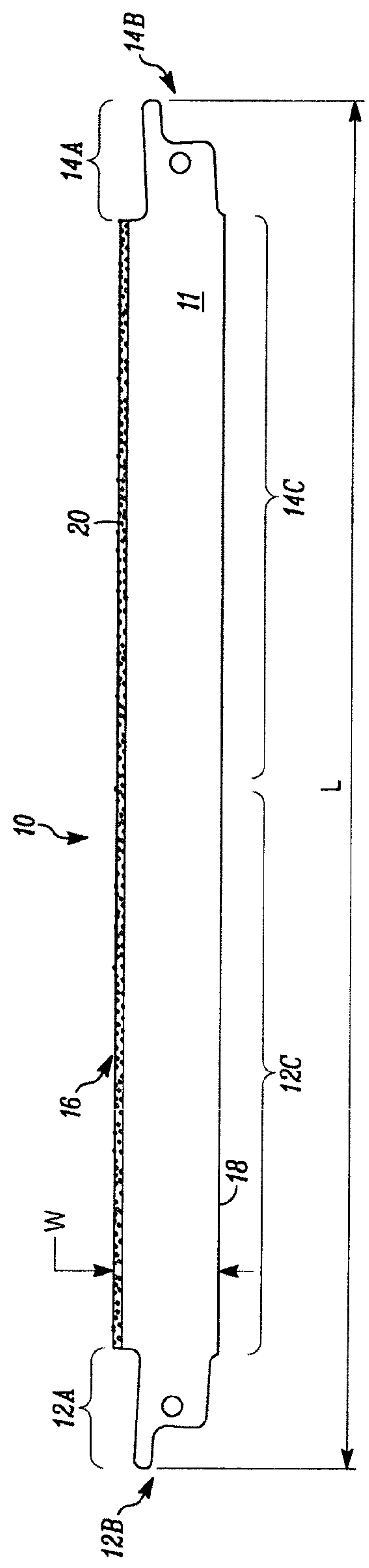
FIG. 1A is a side elevational view of a recip saw blade of the present invention including a first tang on one end of the blade, a second tang on the opposite end of the blade, and a substantially uniform grit cutting edge extending along the blade body between the first and second tangs.

Referring to the drawings and, in particular, FIG. 1, a reciprocating saw blade with a tang at each end in accordance with an illustrative embodiment of the of the present invention is shown and generally represented by the reference numeral 10. As indicated above, a reciprocating saw is a hand-held saw that includes a chuck or like mechanism for releasably engaging a saw blade and driving the saw blade in a reciprocating motion, such as a jig saw or a recip saw. The reciprocating saw causes the saw blade 10 to move in a reciprocating motion in a series of push and pull strokes, i.e., forward strokes and return strokes. During each stroke, the saw blade 10 moves between a rearmost position and a forwardmost position to, in turn, apply a cutting action to a workpiece. When the reciprocating saw blade 10 is engaged by a reciprocating saw chuck at one end of the blade, the opposite end of the blade defines a free end that is allowed to move into engagement and through a workpiece.

The reciprocating saw blade 10 includes a blade body 11 defining a first end 12A including a first tang 12B, and a second end 14A including a second tang 14B. As can be seen, the first end 12A including the first tang 12B is located at one end of the blade body 11 and is engageable with the chuck of a reciprocating saw (not shown). Likewise, the second end 14A including the second tang 14B is located at the opposite end of the blade body 11 and is alternatively engageable with the chuck of a reciprocating saw. The design of the first tang 12B and the second tang 14B make the reciprocating saw blade 10 compatible with recip saws, and therefore the blade 10 is a recip blade. The blade 10 further includes a cutting edge 16 extending along one side of the blade body between the first end 12B and the second end 14B of the blade, and a back or non-working edge 18 located on the opposite side of the blade body relative to the cutting edge 16. In the illustrated embodiment, and as described further below, the cutting edge 16 is a substantially uniform cutting edge that extends from approximately one end of the blade body to the opposite end of the blade body. The back edge 18, on the other hand, is a non-working edge. In the illustrated embodiment, the back edge 18 is substantially parallel to the cutting edge 16. However, as may be recognized by those or ordinary skill in the pertinent art based on the teachings herein, the orientation, shape and/or configuration of the non-working edge 18 may vary as needed to accomplish different cutting operations or otherwise as desired.

Figure 2:
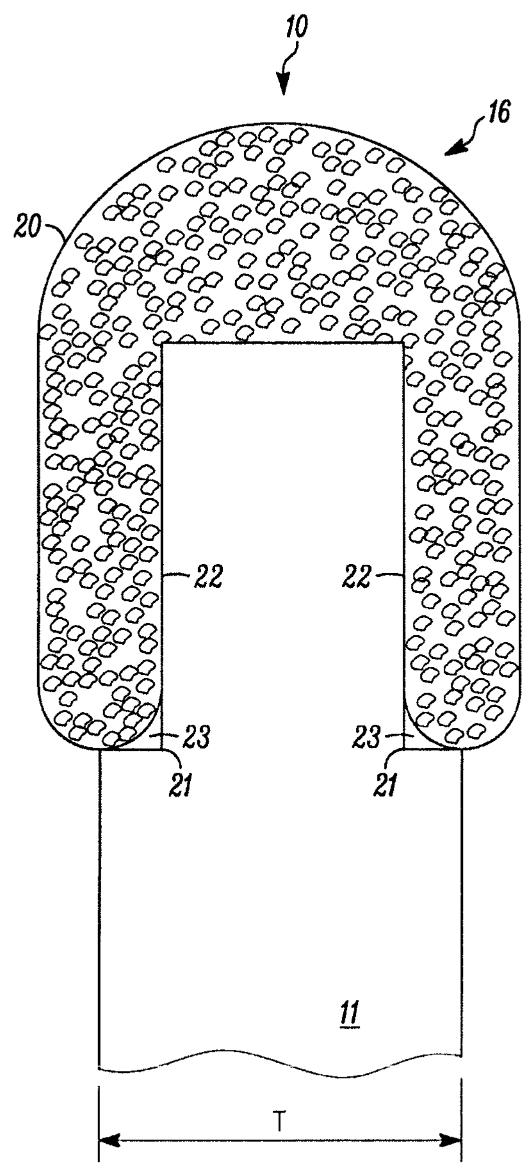
FIG. 2 is an enlarged, partial, cross-sectional view of the reciprocating saw blade of FIG. 1A illustrating in further detail the uniform cutting edge of the blade.

The first tang 12B is engageable with the chuck of a reciprocating saw, such as a recip saw, for releasably securing the first end 12A to the reciprocating saw and forming with the second end 14A and second tang 14B a free end of the saw blade 10 that is drivable in a reciprocating motion by the reciprocating saw. Similarly, the second tang 14B is alternatively engageable with the chuck of a reciprocating saw for releasably securing the second end 14A to the reciprocating saw and forming with the first end 12A and first tang 12B a free end of the saw blade 10 drivable in a reciprocating motion by the reciprocating saw. Accordingly, only one end (12A or 14A) of the reciprocating saw blade 10 is engaged with the chuck of a reciprocating saw at any one time, and the other end of the reciprocating saw blade defines a free end that is driven by the reciprocating saw in a reciprocating motion into engagement and through a workpiece. In order to effectively operate in a reciprocating saw, and in contrast to, for example, a scroll saw blade, the body 11 of the reciprocating saw blade 10 must be sufficiently rigid to allow the blade 10 to be engaged by the chuck of a reciprocating saw at only one end of the blade 10, while the opposite free end of the blade 10 is driven in a reciprocating motion into engagement with and through a workpiece. In the illustrated embodiment, the blade body 11 is formed of metal, such as carbon steel or spring steel. As shown in FIG. 1A, the blade body 11 defines a length "L" within the range of about 6 inches to about 12 inches and a width "W" within the range of about ½ of an inch to about 1½ inches, and as shown in FIG. 2, defines a thickness "T" within the range of about $^{25}/_{1000}$ of an inch to about $^{75}/_{1000}$ of an inch.

As shown in FIG. 1A, a first portion 12C of the cutting edge 16 extending adjacent to the first tang 12B defines a first primary cutting surface, and a second portion 14C of the cutting edge 16 extending adjacent to the second tang 14B defines a second primary cutting surface. One advantage of the currently preferred embodiments of the present invention is that when one of the primary cutting surfaces (12C or 14C) becomes worn out, the blade may be flipped within the reciprocating saw to present the other primary cutting surface (12C or 14C) for use. For example, when the reciprocating saw blade 10 is releasably secured in a chuck by the first tang 12B, the first portion 12C is the primary cutting surface of the blade (because it is located at the inner end of the blade) and thus typically will become damaged or worn to a greater degree than the second portion 14C extending along and adjacent to the free end 14A of the blade. This condition may arise from a variety of factors including a need to contact the workpiece with the inner end of the blade adjacent to the foot or shoe of the reciprocating saw during use, undersized workpieces as compared to conventional blade length, and/or the relatively short stroke length of typical reciprocating saws. Accordingly, once the first primary cutting surface 12C becomes worn or damaged, the first tang 12B may be disengaged from the chuck of the reciprocating saw, the reciprocating saw blade 10 flipped or rotated 180°, and the second tang 14B may be inserted into and engaged with the chuck to, in turn, present the second primary cutting surface 14C as the primary cutting surface of the blade. As a result, the wear life of the blades of the present invention can be significantly extended in comparison to prior art reciprocating saw blades having only one tang at one end of the blade. This aspect of the present invention is particularly advantageous when implemented in connection with reciprocating saw blades having relatively costly cutting edges, such as diamond grit or other carbide grit cutting edges.

In the illustrated embodiment, the cutting surface of the cutting edge 16 is defined by a cutting element 20 that forms a substantially uniform cutting surface extending from approximately the first end 12A to approximately the second end 14A of the blade body 11. In the currently preferred embodiment, the cutting element 20 is a substantially uniform grit extending from one end of the blade body 11 to the other end of the blade body. In another embodiment, the cutting element 20 is a substantially uniform tooth pattern extending from one end of the blade body 11 to the other end of the blade body. During the pull and push strokes applied by a reciprocating saw to the reciprocating saw blade 10, the cutting edge 16 applies a reciprocating cutting action to a workpiece.

As shown in FIG. 1A, the cutting element 20 is a foreign substance or member applied to the cutting edge 16, and in the illustrated embodiment, is a diamond or carbide grit. Also in the illustrated embodiment, the grit 20 is applied to the cutting edge 16 without directional orientation so that the grit will impart substantially the same cutting action during both the pull and push strokes of the blade, and regardless of which end of the blade is engaged by the chuck of a reciprocating saw. In another embodiment which includes a substantially uniform tooth pattern, the teeth are shaped and dimensioned without directional orientation so that the teeth will impart substantially the same cutting action during both the pull and push strokes of the blade, and regardless of which end of the blade is engaged by the chuck of a reciprocating saw. Also in such embodiments, the cutting element 20 is substantially uniform along the entire length of the cutting edge 16 to thereby form a substantially uniform cutting edge without directional orientation from one end of the blade to the other. Because the cutting element 20 defines a substantially uniform cutting surface without directional orientation extending from one end of the blade body 11 to the other end of the blade body 11, the cutting action imparted on a workpiece is substantially the same regardless of which end (12A or 14A) of the blade 10 is engaged by the chuck of the reciprocating saw and which end (12A or 14A) of the blade 10 defines the free end that is not engaged by the chuck of the saw. In other words, when the first tang 12B is engaged by the chuck the cutting action applied to a workpiece is substantially the same as when the second tang 14B is engaged by the chuck.

As shown in FIG. 2, the cutting element 20 is applied to the cutting edge 16 along the front and opposing side surfaces of the cutting edge. The blade body 11 defines opposing recessed side surfaces 22 that are recessed inwardly relative to the respective sides of the blade body 11, that extend inwardly from the front edge of the blade body, and that extend axially along the length of the cutting edge 16. The cutting element 20, such as diamond or carbide grit, is applied in a substantially uniform manner within and along the recessed side surfaces 22 and the front edge of the blade body 11, and is fixedly secured to the blade body 11 to thereby define a uniform cutting edge extending from one end of the blade body to the other. In the embodiment shown in FIG. 2, the cutting element 20 does not fully penetrate into corners 21 defined at the junctions of the recessed side surfaces 22 and the blade body 11, such that a gap or space 23 is formed between the cutting element 20 and a respective corners 21. As may be recognized by those of ordinary skill in the pertinent art based on the teachings herein, the cutting edge 16 and cutting element 20 thereon are only exemplary, and may take the form of any of numerous different types of cutting edges and/or cutting edge materials that that are currently known, or that later become known, including without limitation, different types of diamond, carbide or other grit cutting edges, carbide tipped cutting edges, and bi-metal cutting edges.

Figure 3A:
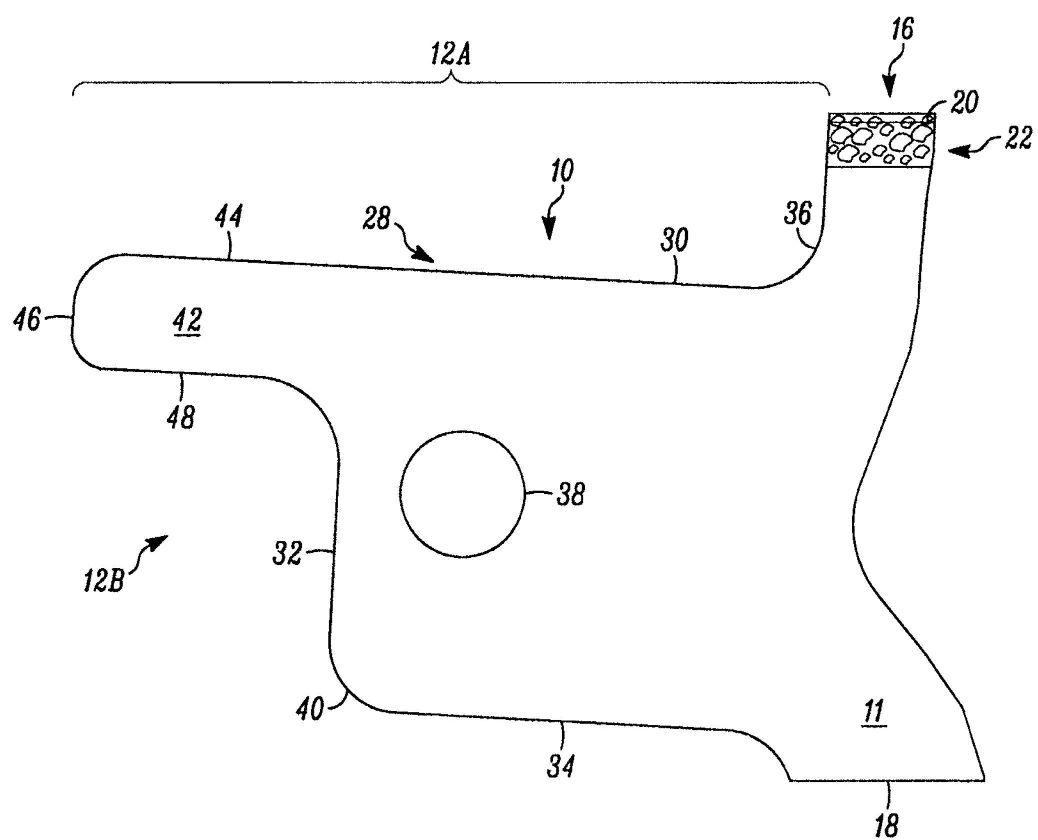
FIG. 3A is an enlarged, partial, side elevational view of the reciprocating saw blade of FIG. 1A illustrating one of the tangs in further detail.

Turning to FIG. 3A, each of the first and second tangs 12B, 14B of the reciprocating blade 10 include a tang 28 defining a first front edge 30, a first side edge 32, and a first back edge 34. Each first front edge 30 is laterally offset a predefined distance from the cutting edge 16 of the blade body 11 by a necking 36. Each necking 36 defines a respective end of the cutting edge 16, and in the illustrated embodiment, is curvilinear. The degree of offset formed by the necking may vary depending on any of a variety of factors known to those of ordinary skill in the pertinent art. Each first front edge 30 is oriented substantially parallel to the cutting edge 16. Each first side edge 32 is substantially straight or linear, and is substantially perpendicular to the respective first side edge 32 and first back edge 34. Each first back edge 34 is preferably offset a predetermined distance from the non-working edge 18 of the blade body 11 by the necking 36. Each first back edge 34 is substantially straight or linear and also is substantially parallel to the respective first front edge 30. The tang 28 further defines a tang aperture 38 extending through the tang, and a tang chamfer 40 extending between the respective first side edge 32 and first back edge 34. One purpose of the tang aperture 38 is to increase the strength and otherwise enhance the safety associated with clamping or connecting the blade 10 to a particular clamping device (e.g., a chuck) by use of a connecting element (e.g., a stud or pin) through the tang aperture 38 whenever the configuration or construction of the clamping device permits. Thus, the tang aperture 38 may be sized, shaped, positioned and/or configured to operatively accommodate any of a variety of different chucks or like connecting elements. The tang chamfer 40 forms a part of the first back edge 34 of the tang 28. The tang chamfer 40 is preferably substantially curvilinear, as shown. One purpose of the tang chamfer 40 is to facilitate the effective and efficient insertion of the tang 28 into a variety of different chucks or other clamping devices. As may be recognized by those of ordinary skill in the pertinent art based on the teachings herein, the above-described features of the tangs of the reciprocating saw blade of the present invention are only exemplary, and the tangs of the blades of the present invention may take any of numerous different tang shapes and/or configurations that are currently known or that later become known, including without limitation tangs that are angled relative to cutting surface, tangs including the same or similar features as described above, that have certain above-described features omitted, and/or features in addition to those described above.

As also shown typically in FIG. 3A, each tang 28 of the reciprocating saw blade 10 includes a tang stem 42 defining a reduced width portion of the tang 28 that extends rearwardly on the respective tang 28 for receipt within the chuck or like tang-engaging device of a reciprocating saw. Each tang stem 42 defines a second front edge 44, a second side edge 46, and a second back edge 48. Each second front edge 44, as shown, is aligned with and substantially parallel to the first front edge 30 of the respective tang 28. Each second side edge 46 is substantially perpendicular to the respective second front edge 44 and/or cutting edge 16. Each second side edge 46 is substantially straight or linear. Each second back edge 48, as shown, is offset a predetermined distance from the first back edge 34 of the respective tang 28. The degree of offset may vary depending on any of a variety of factors known to those of ordinary skill in the pertinent art. The second back edge 48 of each tang stem 42 is oriented at a predefined angle with respect to the first and second front edges 30 and 44, respectively, (or with respect to the first back edge 34 of the respective tang 28 and/or the non-working edge 18 of the blade portion 11). In one embodiment, the angle of the second back edge 48 of the tang stem 42, with respect to the first and second front edges 30 and 44, respectively, is zero—i.e., the second back edge 48 of the tang stem 42 is substantially parallel with respect to the first and/or second front edges 30 and 44. As may be recognized by those of ordinary skill in the pertinent art based on the teachings herein, these features of the tang stem are only exemplary, and the tang stems of the blades of the present invention may take any of numerous different tang stem shapes and/or configurations that are currently known or that later become known. For example, the tangs and/or tang stems may take the form of any of the tangs or tapered tang stems disclosed in co-pending U.S. patent application Ser. No. 11/106,907, filed Apr. 15, 2005, entitled "Reciprocating Saw Blade With Tapered Tang Stem", which is assigned to the Assignee of the present invention, and is hereby expressly incorporated by reference in its entirety as part of the present disclosure.

As described above, the tangs of the reciprocating blades are sized and shaped to allow the blades to be engaged by a chuck. In alternative embodiments of the present invention, the specific design of the first tang 12B and/or second tang 14B may conform to a standard or conventional design to be compatible with widely used reciprocating saws and chucks, such as a one-half inch universal tang. In other alternative embodiments, the first tang 12B and second tang 14B are shaped and dimensioned to be compatible with (i.e., capable of being releasably engaged by) a unique or specific chuck of a reciprocating saw, such as a quick change chuck. In other alternative embodiments, the first and second tangs 12B and 14B, respectively, are different from each other to, for example, fit different types of chucks or different types of reciprocating saws. Such alternative embodiments are contemplated and include all tang/chuck designs currently known or not yet known in the art.

Figure 1B:
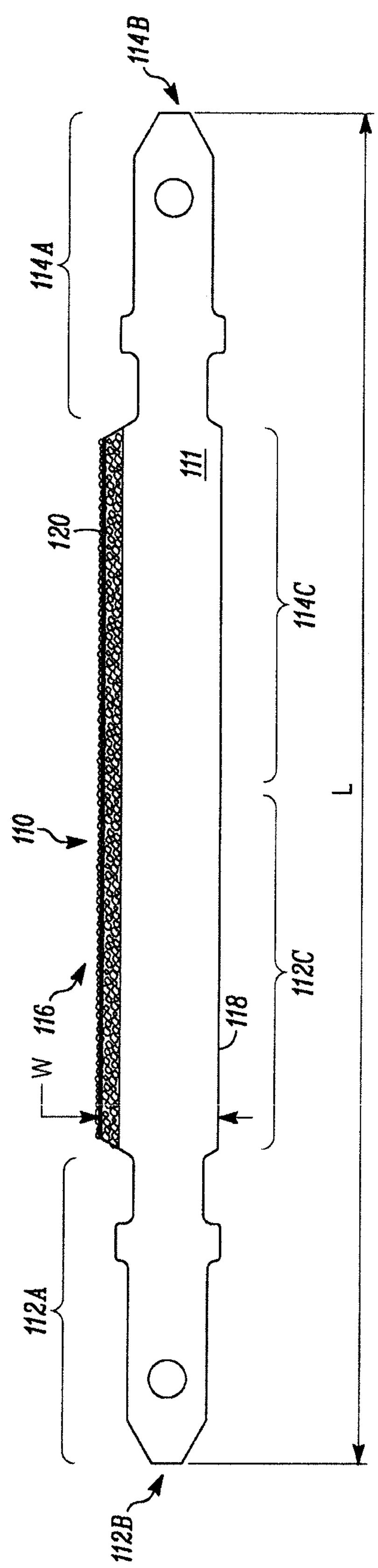
FIG. 1B is a side elevational view of a jig saw blade of the present invention including a first tang on one end of the blade, a second tang on the opposite end of the blade, and a substantially uniform grit cutting edge extending along the blade body between the first and second tangs.
Figure 3B:
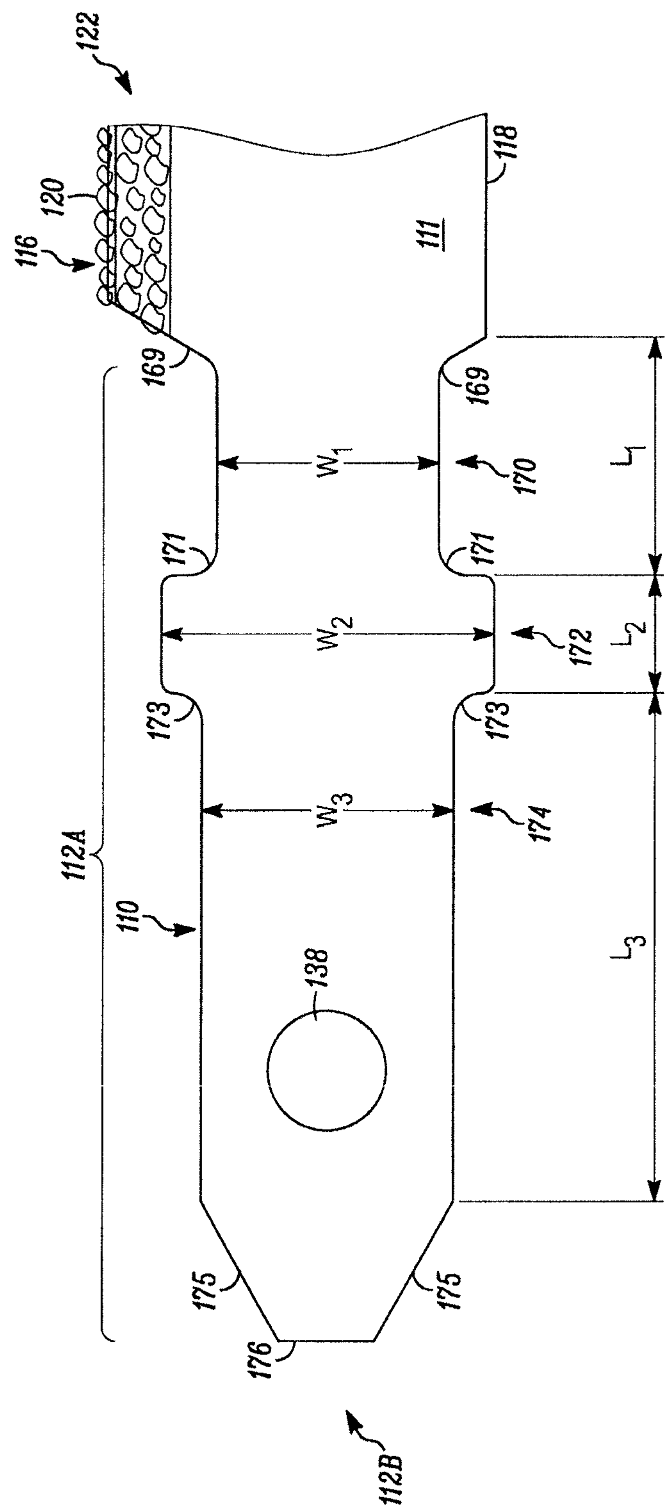
FIG. 3B is an enlarged, partial, side elevational view of the reciprocating saw blade of FIG. 1B illustrating one of the tangs in further detail.

One such alternative embodiment is shown in FIGS. 1B and 3B and is indicated generally by the reference numeral 110. The reciprocating saw blade 110 is substantially similar to the reciprocating saw blade 10 described above, and therefore like reference numerals preceded by the numeral "1" are used to indicate like elements. The primary difference of the reciprocating saw blade 110 in comparison to the reciprocating saw blade 10 is that the design of the first and second tangs 112B, 114B make the reciprocating saw blade 110 compatible with jig saws, as opposed to recip saws, and therefore blade 110 is a jig saw blade as opposed to a recip saw blade. The first and second tangs 112B, 114B are "t-shank" type tangs commonly provided on jig saw blades for releasably connecting jig saw blades to compatible "t-shank" chucks on jig saws.

As shown typically in FIG. 3B, each of the first and second tangs 112B, 114B of the reciprocating blade 110 include a first portion 170 extending from the blade body 111 and defined by a first width W1, a second portion 172 extending form the first portion 170 and defined by a second width W2, and a third portion 174 extending from the second portion 172 and defined by a third width W3. Each of the first portion 170, the second portion 172 and the third portion 174 is defined by substantially parallel side edges that are offset a predefined distance from the cutting edge 116 and the back edge 118, respectively. The side edges of the first portion 170 are substantially evenly offset inwardly from the cutting edge 116 and the back edge 118 such that its width W1 is less than the width W of the blade body 111, and its length L1 is substantially less than the length L of the blade body 111. The transitions between the side edges of the first portion 170 and the cutting edge 116 and the back edge 118, respectively, are defined by a first necking 169. Each first necking 169 defines a respective end of the cutting edge 116, and in the illustrated embodiment, is linear and extends at an acute angle between the ends of the side edges of the first portion 170 and the ends of the cutting edge 116 and the back edge 118, respectively. The side edges of the second portion 172 are substantially evenly offset inwardly from the cutting edge 116 and the back edge 118 such that its width W2 is less than the width W of the blade body 111 but greater than the width W1 of the first portion 170. The length L2 of the second portion 172 is less than the length L1 of the first portion 170. The transitions between the ends of the side edges of the second portion 172 and the ends of the side edges of the first portion 170 are defined by a second necking 171. Each second necking 171 defines a respective end of the first portion 170, and in the illustrated embodiment, is curvilinear. The side edges of the third portion 174 are substantially evenly offset inwardly from the cutting edge 116 and the back edge 118 such that its width W3 is less than the width W of the blade body 111 and the width W2 of the second portion 172, but greater than the width W1 of the first portion 170. The length L3 of the third portion 174 is greater than the length L2 of the second portion 172 and the length L1 of the first portion 170. The transitions between the ends of the side edges of the third portion 174 and the ends of the side edges of the second portion 172 are defined by a third necking 173. Each third necking 173 defines a respective end of the second portion 172, and in the illustrated embodiment, is curvilinear.

The third portion 174 further defines narrowing side edges 175. In the illustrated embodiment, each narrowing side edge 175 is linear and extends inwardly at an acute angle from the ends of the side edges of the third portion 174 to the ends of an end edge 176, respectively. The end edge 176 extends substantially perpendicular to the cutting edge 116 and the back edge 118, and defines the inner edge of the respective tangs 112B, 114B. One purpose of the narrowing side edges 175 is to facilitate the effective and efficient insertion of the tangs 112B, 114B into a variety of different chucks or other clamping devices. The third portion 174 also defines a tang aperture 138 extending through the third portion 174. One purpose of the tang aperture 138 is to increase the strength and otherwise enhance the safety associated with clamping or connecting the blade 110 to a particular clamping device (e.g., a chuck) by use of a connecting element (e.g., a stud or pin) through the tang aperture 138 whenever the configuration or construction of the clamping device permits. Thus, the tang aperture 138 may be sized, shaped, positioned and/or configured to operatively accommodate any of a variety of different chucks or like connecting elements.

Figure 1C:
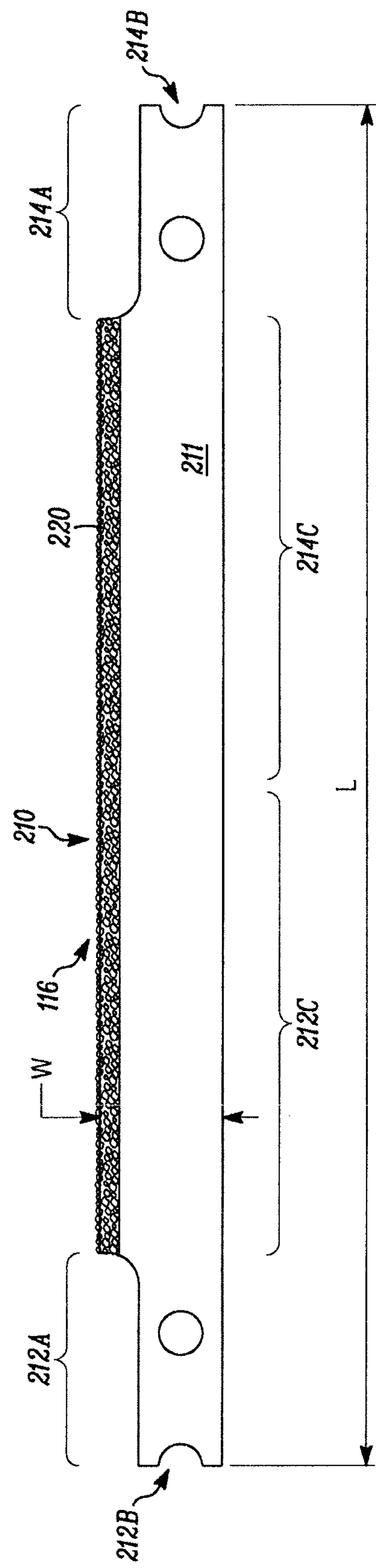
FIG. 1C is a side elevational view of another embodiment of a jig saw blade of the present invention including a first tang on one end of the blade, a second tang on the opposite end of the blade, and a substantially uniform grit cutting edge extending along the blade body between the first and second tangs.
Figure 3C:
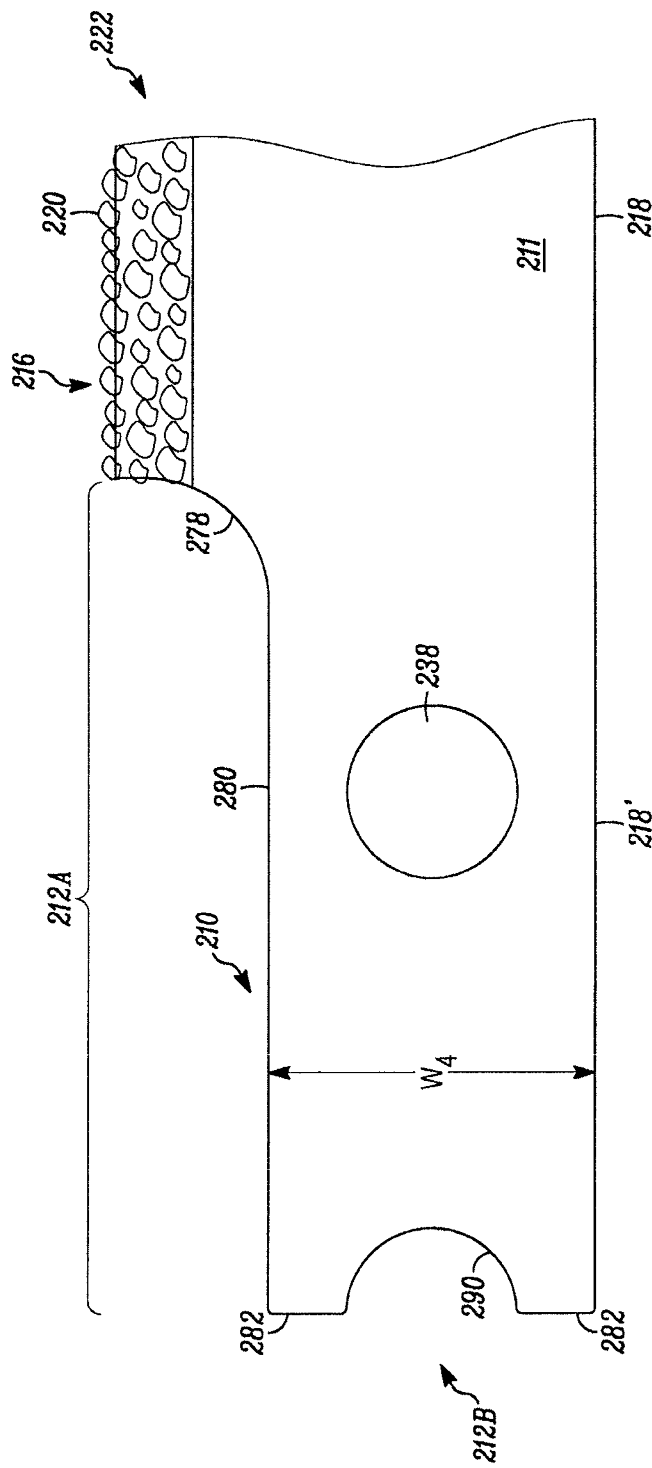
FIG. 3C is an enlarged, partial, side elevational view of the reciprocating saw blade of FIG. 1C illustrating one of the tangs in further detail.

Another alternative embodiment of the reciprocating saw blade of the present invention is shown in FIGS. 1C and 3C and is indicated generally by the reference numeral 210. The reciprocating saw blade 210 is substantially similar to the reciprocating saw blades 10 and 110 described above, and therefore like reference numerals preceded by the numeral "2", or preceded by the numeral "2" instead of the numeral "1", are used to indicate like elements. The primary difference of the reciprocating saw blade 210 in comparison to the reciprocating saw blade 10 is that the design of the first and second tangs 212B, 214B make the reciprocating saw blade 210 compatible with jig saws, as opposed to recip saws, and therefore saw blade 210 is a jig saw blade as opposed to recip saw blade. The primary difference of the reciprocating saw blade 210 in comparison to the reciprocating saw blade 110 is that the first and second tangs 212B, 214B define a "universal shank" type jig saw tang as opposed to a "t-shank" type jig saw tang. "Universal shank" type jig saw tangs are commonly provided on jig saw blades for releasably connecting the jig saw blades to a wide array of chucks commonly provided on jig saws.

As shown in FIG. 3C, each of the "universal shank" type first and second tangs 212B, 214B of the reciprocating blade 210 include a back side edge 218' that extends homogeneously from the back side edge 218 of the blade body 211. The first and second tangs 212B, 214B also define a front edge 280 that is substantially parallel to and offset a predefined distance from the cutting edge 216 of the body 211 by a necking 278. The necking 278 defines a respective end of the cutting edge 216, and in the illustrated embodiment, is curvilinear. The degree of offset formed by the necking 278 may vary depending on any of a variety of factors known to those of ordinary skill in the pertinent art. Each first front edge 280 is oriented substantially parallel to the cutting edge 216. Each first side edge 280 is substantially straight or linear, and is substantially perpendicular to a respective end edge 282 formed contiguous thereto. The end edges 282 extend inwardly to an arcuate, central end edge portion 290. The arcuate end edge 290 is oriented such that it extends into its respective tang 212B, 214B towards the blade body 211. The tangs 212B, 214B of reciprocating blade 210 further define a tang aperture 238 extending through the tang. One purpose of the tang aperture 238 is to increase the strength and otherwise enhance the safety associated with clamping or connecting the blade 210 to a particular clamping device (e.g., a chuck) by use of a connecting element (e.g., a stud or pin) through the tang aperture 238 whenever the configuration or construction of the clamping device permits. Thus, the tang aperture 238 may be sized, shaped, positioned and/or configured to operatively accommodate any of a variety of different chucks or like connecting elements.

Figure 4A:
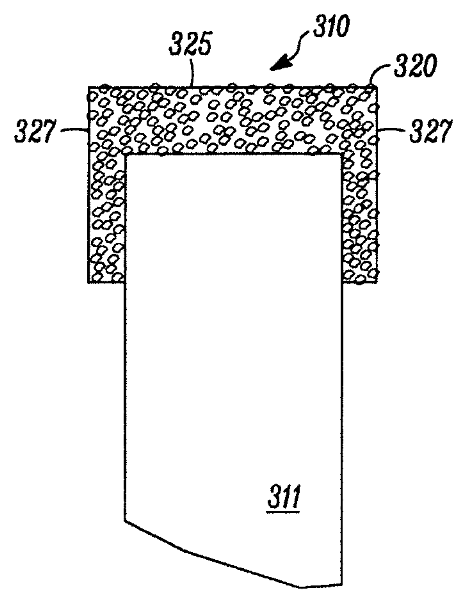
FIG. 4A is an enlarged, partial, cross-sectional view of another embodiment of a reciprocating saw blade of the present invention.

In FIG. 4A another embodiment of the reciprocating saw blade of the present invention is indicated generally by the reference numeral 310. The reciprocating saw blade 310 is substantially similar to the reciprocating saw blade 10 described above, and therefore like reference numerals preceded by the numeral "3" are used to indicate like elements. The primary differences of the reciprocating saw blade 310 in comparison to the reciprocating saw blade 10 are that the blade body 311 defines a substantially flat front or top edge and side surfaces, and the cutting element 320 applied in a substantially uniform manner defines a substantially flat front or top edge 325 extending over the front edge of the blade body 311 and substantially planar side edges 327 extending inwardly from the substantially flat front edge 325 along the respective side surfaces of the blade body 311.

Figure 4B:
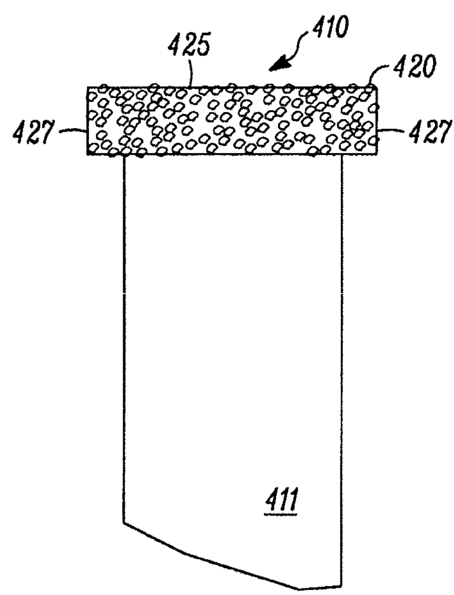
FIG. 4B is an enlarged, partial, cross-sectional view of another embodiment of a reciprocating saw blade of the present invention illustrating the uniform cutting edge of the blade.

In FIG. 4B another embodiment of the reciprocating saw blade of the present invention is indicated generally by the reference numeral 410. The reciprocating saw blade 410 is substantially similar to the reciprocating saw blades 10 and 310 described above, and therefore like reference numerals preceded by the numeral "4", or preceded by the numeral "4" instead of the numeral "3", are used to indicate like elements. The primary differences of the reciprocating saw blade 410 in comparison to the reciprocating saw blades 10 and 310 are that the blade body 411 defines a substantially flat front or top edge and side surfaces, and the cutting element 420 applied in a substantially uniform manner defines a substantially flat front or top edge 425 extending over the front edge of the blade body 411, and substantially planar side edges 427 extending outwardly past the respective side surfaces of the blade body 411 and downwardly on opposite sides of the front or top edge 425 relative to each side (but not along the side walls of the blade body). As may be recognized by those of ordinary skill in the pertinent art based on the teachings herein, the above-described embodiments of the cutting element of the reciprocating saw blade of the present invention are only exemplary, and the cutting element of the blades of the present invention may take any of numerous different shapes and/or configurations that are currently known or that later become known, including a cutting element with the same or similar features as described above, a cutting element that has certain above-described features omitted, and/or features in addition to those described above.

Figure 5:
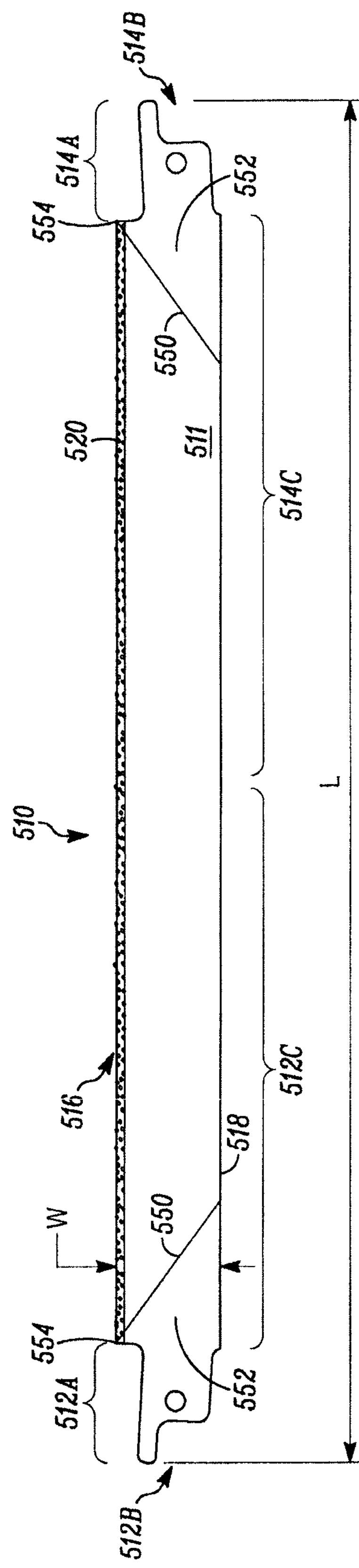
FIG. 5 is a side elevational view of another embodiment of a reciprocating saw blade of the present invention that includes scores for selectively removing the first and second tangs.

In FIG. 5 another embodiment of the reciprocating saw blade of the present invention is indicated generally by the reference numeral 510. The reciprocating saw blade 510 is substantially similar to the reciprocating saw blade 10 described above, and therefore like reference numerals preceded by the numeral "5", are used to indicate like elements. The primary difference of the reciprocating saw blade 510 in comparison to the reciprocating saw blade 10 is that the reciprocating saw blade 510 includes scores 550 formed on the blade body 511 and positioned toward the ends of blade body 511 but spaced inwardly from the respective tangs 512B, 514B. The scores 550 extend linearly from the cutting edge 516 to the back edge 518 at an acute angle relative to the cutting edge 516 and the back edge 518 such that an acute edge and point or tip 554 is defined by each score 550. In the illustrative embodiment, each score 550 is defined by an approximately V-shaped score line in cross-section that defines a predefined depth within the blade body 511 that is sufficiently deep that allows the adjacent portion 552 to be manually engaged and snapped or broken away at the respective score 550 (e.g., with a pair of pliers), but is sufficiently strong to prevent the blade from breaking at the score 550 during use. Alternatively, each score 550 may be defined by pairs of opposing score lines located on opposite sides of the blade relative to each other, and aligned with each other. As may be recognized by those of ordinary skill in the pertinent art based on the teachings herein, the scores 550 may take any of numerous different shapes and/or configurations that are currently known or later become known.

Accordingly, the scores 550 define a division between the blade body 511 and the tangs 512B, 514B. Because the scores 550 are angled relative to the cutting edge 516 and the back edge 518 such that an acute point or tip 554 is formed between the scores 550 and the cutting edge 516, the scores 550 also define a division between the blade body 511 and a section 552 of the blade body 511 adjacent to the tangs 512B, 514B that includes a portion of the back edge 518. In use, the scores 550 allow a user to apply a predetermined amount of force across the scores 550 to break the blade at the scores 550 and in turn remove a respective tang 512B, 514B and a section 552 of the blade body 511 adjacent to the tang 512B, 514B from the reciprocating saw blade 510, and thereby form an acute point or tip 554 at the cutting surface 516. The scores 550 are particularly useful when, for example, a portion 512C, 514C of the cutting edge 516 becomes dull or damaged. In such a scenario, a user can remove the tang 512B, 514B associated with the worn portion 512C, 514C to create a reciprocating saw blade with an acute point or tip 554 at one end, and a tang 512B, 514B located at the other end of the blade 510 that is adjacent to a usable or pristine portion 512C, 514C of the cutting edge 516. As may be recognized by those of ordinary skill in the pertinent art based on the teachings herein, the above-described features of the reciprocating saw blade of the present invention are only exemplary, and the scores of the present invention may take any of numerous different shapes and/or configurations that are currently known or that later become known. For example, the scores may define a tip at the non-working edge or at a location between the non-working edge and the cutting edge. As another example, multiple scores may achieve the same or similar result as a single score line. As yet another example, the scores may not be located, at least in part, on the blade body, but instead be formed by one or both tangs.

Figure 6:
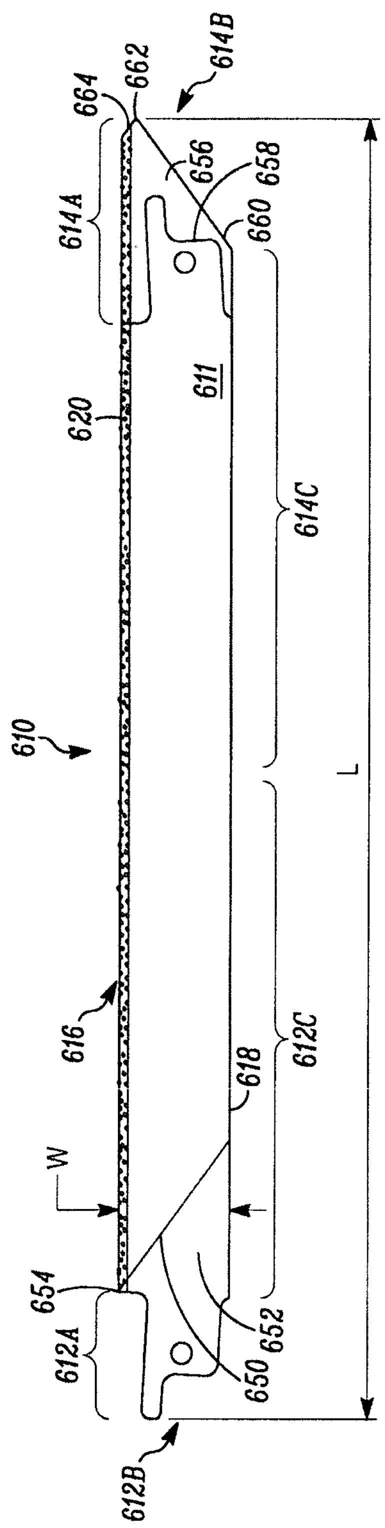
FIG. 6 is a side elevational view of another embodiment of a reciprocating saw blade of the present invention including score lines defining the tang at an end of the blade for removing a tip formed contiguous to the tang to expose the tang for use, and another score line formed at the other end of the blade for removing the adjacent tang and forming a tip at the respective end of the blade.

In FIG. 6 another embodiment of the reciprocating saw blade of the present invention is indicated generally by the reference numeral 610. The reciprocating saw blade 610 is substantially similar to the reciprocating saw blades 10 and 510 described above, and therefore like reference numerals preceded by the numeral "6", or preceded by the numeral "6" instead of the numeral "5", are used to indicate like elements. The primary difference of the reciprocating saw blade 610 in comparison to the reciprocating saw blades 10 and 510 is that the tang 614B of the reciprocating saw blade 610 is defined by a score line 658, and a pointed tip 656 extends distally from the score 658 forming the tang 614B. The pointed tip 656 is sized and shaped such that it continues from the blade body 611 and the tang 614B to surround the tang 614B in such a manner that the back edge 616 and the cutting edge 616 extend uninterrupted from the blade body 611 through the pointed material 656 to a side edge 660. The side edge 660 of the pointed material 656 extends from the cutting edge 616 to the back edge 618 at an acute angle relative to the cutting edge 616 and the back edge 618 such that an acute point or tip 662 is formed between the side edge 662 660 and the cutting edge 616. The pointed material 656 further defines an angled, linear edge 664 that extends between the acute point or tip 662 and the cutting edge 616 forming a chamfered corner. The blade 610 also includes another score 650 located at the opposite end of the blade relative to the score 658. The score 650 allows the blade to be manually engaged and snapped or otherwise broken at the score 650 to break away the tang 612B and form a pointed cutting edge.

In use, when the primary cutting region 612C becomes worn, a user can manually engage the pointed tip 656, such as with a pair of pliers, and break away the tip 656 at the tang score 658 to, in turn, expose the tang 614B. The tang 614B can then be mounted in the chuck of a reciprocating saw. The score 658 between the un-exposed tang 614B and the pointed material 656 allows a user to apply a predetermined amount of force across the score 658 to remove the pointed material 656 and expose the tang 614B. The score 658 is particularly useful when, for example, a portion 612C of the cutting edge 616 adjacent to the pre-exposed tang 612B becomes dull or damaged. In such a scenario, a user can remove the pointed material 656 adjacent to the un-exposed tang 614B to create a reciprocating saw blade with exposed tangs 612B, 614B at both ends of the blade body 611 wherein the newly exposed tang 614B is adjacent to a usable or pristine section 614C of the cutting edge 616. Further, a user can remove the pre-exposed tang 612B associated with the worn portion 612C to create a reciprocating saw blade with an acute point or tip 654 at one end and a newly exposed tang 614B at the other end that is adjacent to a usable or pristine section 614C of the cutting edge 616. As may be recognized by those of ordinary skill in the pertinent art based on the teachings herein, the above-described features of the reciprocating saw blade of the present invention are only exemplary, and the pointed material 656 and associated score 658 of the present invention may take any of numerous different shapes and/or configurations that are currently known or that later become known. For example, the score may define a tip at the non-working edge or at a location between the non-working edge and the cutting edge. As another example, multiple scores may be used to assist in removal of the pointed material, and may extend to multiple edges, locations and/or patterns. As yet another example, the pointed material may not be contiguous to all of the edges of the tang or the edges of the blade body may not extend through the pointed material.

As may be recognized by those of ordinary skill in the pertinent art based on the teachings herein, numerous changes and modifications can be made to the above-described and other embodiments of the present invention without departing from the scope of the invention as defined in the appended claims. Many of the features of the saw blades described above are only exemplary, and may be changed as desired, or otherwise as required to meet the requirements of a particular application. For example, in some embodiments, the cutting edge may be defined by cutting teeth, such as carbide tipped, bi-metal, or traditional carbon steel teeth. In addition, the saw blades of the present invention may be coated with any of numerous different coatings that are currently known or that later become known, such as a titanium nitride coating (TiN), or an aluminum titanium nitride coating (AlTiN). In other embodiments, the cutting edge may be designed to favor either the push or the pull stroke of the blade, i.e., to apply greater cutting action during the pull stroke as compared to the push stroke, or vice versa. In such an embodiment, the blade may favor the push or pull stroke when engaged with a chuck at the first end 12A by the first tang 12B, and, conversely, may favor the opposite stroke when engaged with the chuck at the second end 14A by the second tang 14B. The present disclosure therefore provides a saw blade having a uniform cutting edge capable of favoring, depending which end is engaged to the saw, either the pull or push stroke. As a result, a user of such an exemplary blade of this embodiment can tailor his/her reciprocating saw to the desired cutting action (to favor the pull or push strokes) by flipping the blade on the reciprocating saw. The phrase "substantially uniform cutting edge" is used herein to mean a cutting edge that is substantially identical, consistent, or without variations in detail along the length of the cutting edge. The phrase "cutting edge without directional orientation" is used herein to mean a cutting edge that will impart substantially the same cutting action during both the pull and push strokes of the blade, and regardless of which end of the blade is engaged by the chuck of a reciprocating saw. Accordingly, this detailed description of the currently preferred embodiments is to be taken in an illustrative, as opposed to a limiting sense.

What is claimed is:

1. A method comprising:

providing a reciprocating saw blade having an axially elongated blade body with a first end portion, a second end portion, a cutting edge extending from the first end portion to the second end portion, an opposite back edge extending from the first end portion to the second end portion, and an exposed first tang devoid of a cutting edge coupled to the first end portion;

removably mounting the first tang in a blade holder of a reciprocating saw to enable cutting a workpiece with the cutting edge upon actuation of the reciprocating saw;

exposing an unexposed second tang devoid of a cutting edge in the blade body between the first end portion and the second end portion by breaking off a first removable portion of the blade body along a first score; and removably mounting the second tang in the blade holder of the reciprocating saw to enable cutting a workpiece with a remaining portion of the cutting edge upon actuation of the reciprocating saw.

2. The method of claim 1, wherein breaking off the first removable portion includes breaking off the second end portion of the blade body.

3. The method of claim 1, wherein the first score includes a first score line having a predetermined depth in one face of the body.

4. The method of claim 3, wherein the first score is V-shaped in cross section.

5. The method of claim 3, wherein at least a portion of the first score is further formed by a second score line having a predetermined depth in an opposite face of the body.

6. The method of claim 1, wherein the second end portion has a first front edge extending from the back edge to the cutting edge and intersecting the cutting edge at an acute angle to form a pointed tip.

7. The method of claim 6, further comprising breaking off a second removable portion of the blade body at a second score between the first end portion and the second end portion.

8. The method of claim 7, wherein breaking off the second removable portion comprises exposing an unexposed second front edge extending from the back edge to the cutting edge and intersecting the cutting edge at an acute angle to form a second pointed tip.

9. The method of claim 7, wherein the second removable portion includes the first end portion.

10. The method of claim 1, further comprising removing the first tang from the blade holder of the reciprocating saw before exposing the unexposed second tang.

11. A method comprising:

providing a reciprocating saw blade having an elongated blade body with a first end, a second end, a cutting edge extending along the blade body between the first end and the second end, and an exposed first tang devoid of a cutting edge coupled to the first end;

removably mounting the first tang in a blade holder of a reciprocating saw;

exposing an unexposed second tang devoid of a cutting edge in the blade body between the first end portion and the second end portion by breaking off a first removable portion of the blade body; and removably mounting the second tang in the blade holder of the reciprocating saw.

12. The method of claim 11, wherein the first removable portion includes the second end.

13. The method of claim 11, wherein breaking off the first removable portion comprises breaking off the first removable portion along a first score that defines the second tang.

14. The method of claim 13, wherein the score is V-shaped in cross section.

15. The method of claim 13, wherein breaking off the first removable portion further comprises breaking off the removable portion along a second score that further defines the second tang.

16. The method of claim 11, wherein the second end includes a first front edge extending from the back edge to the cutting edge and intersecting the cutting edge at a first pointed tip.

17. The method of claim 16, further comprising breaking off a second removable portion of the blade body between the first end portion and the second end portion.

18. The method of claim 17, wherein breaking off the second removable portion comprises exposing an unexposed second front edge extending from the back edge to the cutting edge and intersecting the cutting edge at an acute angle to form a second pointed tip.

19. The method of claim 17, wherein the second removable portion includes the first end portion.

20. The method of claim 11, further comprising removing the first tang from the blade holder of the reciprocating saw before exposing the unexposed second tang.

* * * * *